United States Patent [19]

Whang et al.

[11] Patent Number: 5,513,283

[45] Date of Patent: Apr. 30, 1996

[54] TE-ME MODE CONVERTER ON POLYMER WAVEGUIDE

[75] Inventors: Wol-Yon Whang; Jang-Joo Kim; Tae-Hyoung Zyung; Min-Chul Oh, all of Daejeon, Rep. of Korea

[73] Assignee: Electronics and Telecommunications Research Institute, Daijeon, Rep. of Korea

[21] Appl. No.: 354,167

[22] Filed: Dec. 8, 1994

[30] Foreign Application Priority Data

Oct. 14, 1994 [KR] Rep. of Korea ............... 94-26394

[51] Int. Cl.$^6$ .................................................. G02F 1/295
[52] U.S. Cl. ............................................... 385/8; 385/4
[58] Field of Search ................................. 385/8–11, 4

[56] References Cited

PUBLICATIONS

Optical Society of America, Optics Letters, vol. 5, No. 11, Nov. 1980, pp. 473–475, entitled "Electro–optic waveguide TE⇌TM mode converter with low drive voltage", by R. C. Alperness and L. L. Buhl.

American Institute of Physics, Appl. Phys. Lett. 36(7), 1 Apr. 1980, pp. 513–515, entitled "Efficient waveguide electro–optic TE⇌TM mode converter/wavelength filter" by R. C. Alferness.

IEEE Journal of Quantum Electronics, vol. QE–18, No. 4, Apr. 1982, pp. 763–766, entitled "Electrooptic Polarization Modulation in Multielectrode $Al_xGA_{1-x}AS$ Rib Waveguides" by F. K. Reinhardt, Ralph A. Logan and W. Robert Sinclair.

Primary Examiner—Akm E. Ullah
Attorney, Agent, or Firm—Antonelli, Terry, Stout & Kraus

[57] ABSTRACT

A TE-TM mode converter of a polymer electro-optic polarization waveguide type uses the electro-optic birefringence and the electro-optic effect as a non-linear optical waveguide medium, in which an optical director formed during the poling of a polymer thin film is determined by the direction of the poling electrical field. The poling electrode design enables the optical director having the angle of 45° to the electrical direction of the TE and TM modes to be formed in the polymer thin film. When the waveguide receives the incident light of the TE mode or TM mode, the TE (or TM) mode is switched into the TM (or TE) mode by an effective refraction factor between the optical director and the director perpendicular thereto. If a length of the poling electrode and the birefringence of the waveguide is adjusted, the changes of various electo-optic polarization states are possible. The poled thin film has an electro-optic effect. If a voltage is applied to the thin film, the size of the birefringence derived by the poling is changeable. The use of the electro-optic effect enables the outputting state of the waveguide to be maintained at the TE or TM mode by a bias electrode, and if the switching voltage is applied to the waveguide, the TE-TM mode switching can be accomplished.

4 Claims, 3 Drawing Sheets

TE-ME MODE CONVERTER ON POLYMER WAVEGUIDE

BACKGROUND OF THE INVENTION

The invention relates to a configuration and the operation principle of an electro-optic polarization modulator for use in a waveguide configuration using the optical birefringence and the electro-optic effect during the polling of a non-linear polymer thin film which is a material of an electro-optic waveguide such as an electro-optic modulator, and in particular, to providing a TE-ME mode converter on a polymer waveguide.

PRIOR ART

A conventional TE-ME mode converter has been almost fabricated on a L=NbO₃ and compound semiconductors of III-V, WHR, EEHSMS, II-V. The TE-TM mode converter on a L=NbO is of two types using the storing dielectric constant derived in an electro-optic form and using the interaction between an elastic wave and an optical wave. The former case is mainly used because the latter case is not practical. However, the former case using the storing dielectric constant requires a phase match between the normal modes in order to increase the conversion efficiency, for which the complex electrode configuration is necessary (referring to R. C. Alterness, IEEE. J.Quantum., vol QE-17, PP965–969, 1981). Also, this case has a disadvantage in that the wavelength area enabling the TE-TM conversion has only the bandwidth of about −5A°. In the case of the compound semiconductor, the phase match may be not required like III-V semiconductors, otherwise the phase match may be necessary like II-VI semiconductors. But, the two cases all have two disadvantages in that theft fabrication is complex and the electro-optic conversion efficiency is low. It also has an advantage in that in the integration of an electro-optic polarizer, a TE-ME phase converter etc. necessary for fabricating another optical waveguide element by using the TE-TM converter is very difficult (referring to H. K. Loganm, and W. R. Sinclair) to produce.

In light of these points, it is not possible to provide a TE-TM mode converter on a polymer waveguide that does not need the phase match between the normal modes, to facilitate the integration with another optical waveguide, to simplify its fabrication procedures and is inexpensive.

The term non-linear polymer means a material with molecules having second order non-linear characteristic on an optical linear polymer matrix are doped in various manners. Thus, in order to make the polymers non-linear by simply doping in the polymer then a macroscopic non-linear of a thin film, it is necessary to arrange electrical dipoles of non-linear molecules in one direction in order to maintain the non-linearity of the thin film. It is possible to accomplish thus by performing poling above the glass transition temperature of the polymer matrix.

Poling is a method for artificially arranging electrical dipoles of non-linear polymers freely movable at above the glass transition temperature of the polymer matrix by applying the electrical field from the outside and then fixing the molecules by decreasing the temperature below the transition temperature. The non-linear polymers are generally in form of poles and induce larger differences between the linear polarization along the pole director and the linear polarization in a vertical direction, to cause the thin films processed by the poling procedure to have the electro-optic effect in addition to increase their optical birefringence. The optical birefringence of the non-linear polymer is proportioned to the square of the poling electrical field. The electro-optic coefficient is increased linear.

The object of the invention is to provide a TE-TM mode converter of a optical waveguide using the poling characteristics of a non-linear polymer and the electro-optic effect and the optical birefringence derived during the poling.

SUMMARY OF THE INVENTION

FIG. 1 shows the configuration of a waveguide having a core layer 1 constructed as a waveguide layer of a non-linearity polymer which is used to perform the poling procedure at a predetermined angle by means of upper and lower poling electrodes 3 and 4. The strip waveguide is an example among numerous configurations of the strip waveguides. The strip waveguide configuration actually used is divided into various forms of a photo-bleached waveguide, a stripe-loaded waveguide, a ridge waveguide, etc.

A core layer 1 of a waveguide is a non-linear polymer, and its surrounding portion is a cladding layer 2 made of optically isotropic materials or non-linear materials having the electro-optic coefficient and the optical birefringence but having a relative lower non-linearity. If the direction of the poling electrical field is declined at an average angle of 45° with respect to the x-axis of FIG. 1, the non-linear molecules doped in the core layer 1 are arranged toward the electrical field so that the optical director of a macroscopic non-linear polymer is formed having the average angle of 45° with respect to the x-axis.

Therefore, the principle of the invention is as follows: When light having the polarization of $E_x$(TE) is received, it is thought that the polarization direction of the normal mode becomes the a-director formed by poling and the b-director perpendicular thereto and the component of $E_x$ is divided into $E_a$ and $E_b$. The components $E_a$ and $E_b$ are independently advanced in the waveguide without interfering each other, but they have phases different from those of the incident signal at the end of the waveguide because of the electro-optic birefringence of the waveguide.

If the two components $E_a$ and $E_b$ are converted into two components $E_x$ and $E_y$ at the output terminal of the waveguide, it is possible to provide the output polarization states of various forms according to the phase differences of the components $E_a$ and $E_b$ at the end of the waveguide. The arithmetic expressions of the components $E_a$ and $E_b$ at the end of the waveguide are as follows:

$$E_x = E_{xo} \cos^2(\delta\beta L/2) \quad (1)$$

$$E_y = E_x \sin^2(\delta\beta L/2)$$

Wherein, L is a poling length of a waveguide, and $\delta\beta$ is a difference between the effective propagation constants of two components $E_a$ and $E_b$. It is expressed as follows:

$$\delta\beta = (2\pi/\lambda) - (N_a - N_b) \quad (2)$$

Wherein, $N_a$ and $N_b$ are the effective refraction factors of $E_a$ and $E_b$ at the normal mode, and is a wavelength of light. The difference of the effective refraction factor between the normal modes of the waveguide is dependent upon the refraction factors of the core layer and the cladding layer 2 and the size of the core layer 1. Generally, the difference can be calculated by using the effective refraction factor. But, if the core layer 1 has the optical birefringence, it is difficult to calculate the difference in an analytic function. Thus, the calculation of the difference can be accomplished through the numeric analysis called vector BPM (Bector Beam Propagation).

In the equation (1), if $\delta\beta L/2$ is an integral number magnification of $\pi$, the first outputting state of the waveguide is what TE (Transverse Electric) is outputted in itself. If $\delta\beta L/2$ is an odd integral number magnification of $\pi/2$, $E_a$ and $E_b$ are converted into $E_x$ and $E_y$, respectively. The conditions of TE and TM outputs are represented as the following formula (3):

$$\text{TE}\rightarrow\text{TE}: \delta\beta L/2=m\pi, (m=0, 1, 2, \ldots) \qquad (3\text{-}1)$$

$$\text{TE}\rightarrow\text{TM}: \delta\beta L/2=m(\pi/2), (m=1, 3, 5, \ldots) \qquad (3\text{-}2)$$

Wherein, if the length L is a beat length $L_b$ of the waveguide under the condition of m=1 in equation (3-1), the expression is as follows:

$$L_b=\lambda/(N_a/N_b) \qquad (4)$$

The conditions of equations (3-1) and (3-2) using the beat length are again expressed as follows:

$$\text{TE}\rightarrow\text{TE}: L/L_b=m \ (m=0, 1, 2, \ldots) \qquad (5\text{-}1)$$

$$\text{TE}\rightarrow\text{TM}: L/L_b=m/2 \ (m=1, 3, 5, \ldots) \qquad (5\text{-}2)$$

The output state except for cases expressed by the equations (3) and (5) is normally an oval polarization state.

On the other hand, if the length L of the waveguide or the effective refraction factors $N_a$ and $N_b$ are adjusted to satisfy the conditions of the equations (3) and (5), the first output state of the waveguide can fit into the TE or TM state of the linear polarization. The TE-TM mode conversion is requested to maintain the first outputting at the linear polarization state of the TE or TM.

On the other hands, since the core layer 1 has the electro-optic effect, its upper and lower poling electrodes 4 and 3 used during the poling are removed therefrom. Then the core layer 1 is provided with modulation electrodes (described in detail below) formed on the position of the removed poling electrodes. If the predetermined voltage is applied through the modulation electrodes to the core layer 1, the effective refraction factors $N_a$ and $N_b$ are changed along the a- and b- directors, and the size of the difference $\delta\beta$ of the effective propagation constant between the normal modes is expressed as equation (6):

$$\delta\beta=(2\pi/\lambda)(N_a-N_b)_o+C(\pi/\lambda)n_o^3(\tau_{33}-\tau_{13})(V_m/t) \qquad (6)$$

Wherein, $(2\pi/\lambda)(N_a-N_b)_o$ is the difference of the effective propagation constant before the application of the voltage, $C(\pi/\lambda)n_o^3(\tau_{33}-\tau_{13})(V_m/t)$ is the difference of the effective propagation constant derived by the applied voltage, $n_o$ is the core refraction factor before the poling, $\tau_{33}$ and $\tau_{13}$ is the electro-optic coefficient of the poled thin film which is an electro-optic coefficient of a non-linearity polymer changing the refraction factor along the a- and b- directors of the polymer when the electrical field is applied to the optical directors. The quantity $\tau_{33}$ has the value which is three times the value of the quantity $\tau_{13}$. Also, t is a thickness of the waveguide, and C is a proportional constant. The proportional constant C is an amount related to an applied optical wave, an electrical field, and an overlap of the optical wave, etc.

Referring to the equation 6, when the voltage is applied to the waveguide, the difference of the effective propagation constant of the waveguide is changed due to the difference between the values of the quantities $\tau_{33}$ and $\tau_{13}$. Thus, if $\delta\beta L/2$ is changed by $\pi/2$, the TE-TM mode switching from the polarization of the TE to the polarization of the TM can be accomplished.

BRIEF DESCRIPTION OF THE DRAWINGS

The invention will now be described in detail with reference to the accompanying drawings in which:

FIG. 5 is a view illustrating the configuration of a TE-TM mode converter of a waveguide type wherein FIG. 5A is a cross-sectional view of the TE-TM mode converter and FIG. 5B is a plane view of the TE-TM mode converter.

DETAILED DESCRIPTION OF THE INVENTION

I. Configuration of Poling Electrode

Figure 1:
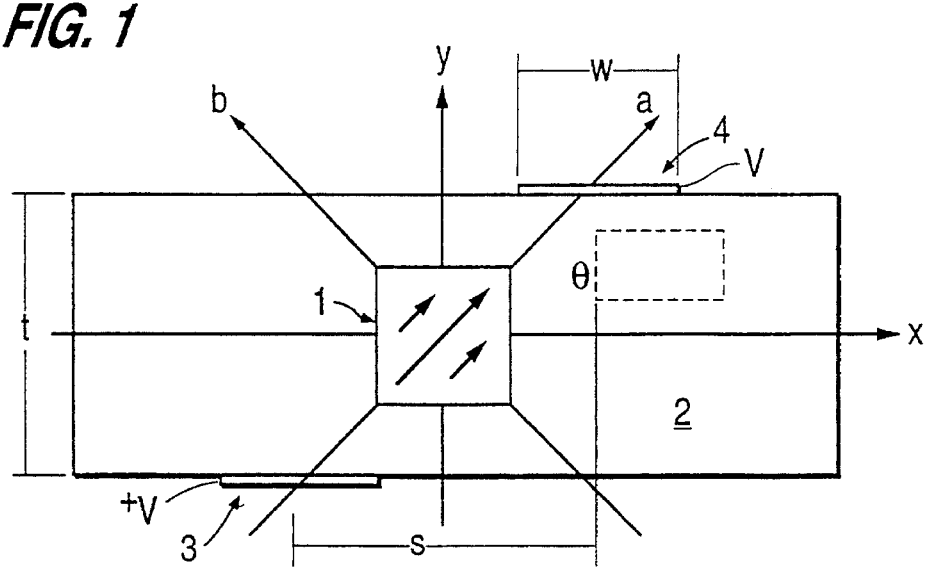
FIG. 1 is a cross-sectional view illustrating the configuration of an electro-optic polarization converter provided with a waveguide poled according to the invention.

According to the invention, the design of a poling electrode for forming the poling electrical field at the angle of 45° is very important to a TE-TM mode converter. As shown in FIG. 1, the upper and lower poling electrodes 3 and 4 must be designed to be spaced away from each other and maintain the direction of the poling electrical field at the angle of about 45° in the core layer 1 of the non-linear polymer waveguide. There are elements, such as the width w of the electrodes 3 and 4 and the horizontal distance s from the center of the upper poling electrode 4 to that of the lower poling electrode 3, which have effects on the formation of the electro-optic director at the angle of 45° to the center of a given thickness t of the waveguide. These elements can be selected to have the proper values considering into the simplification of the fabrication, their operating speeds, etc.

Figure 2:
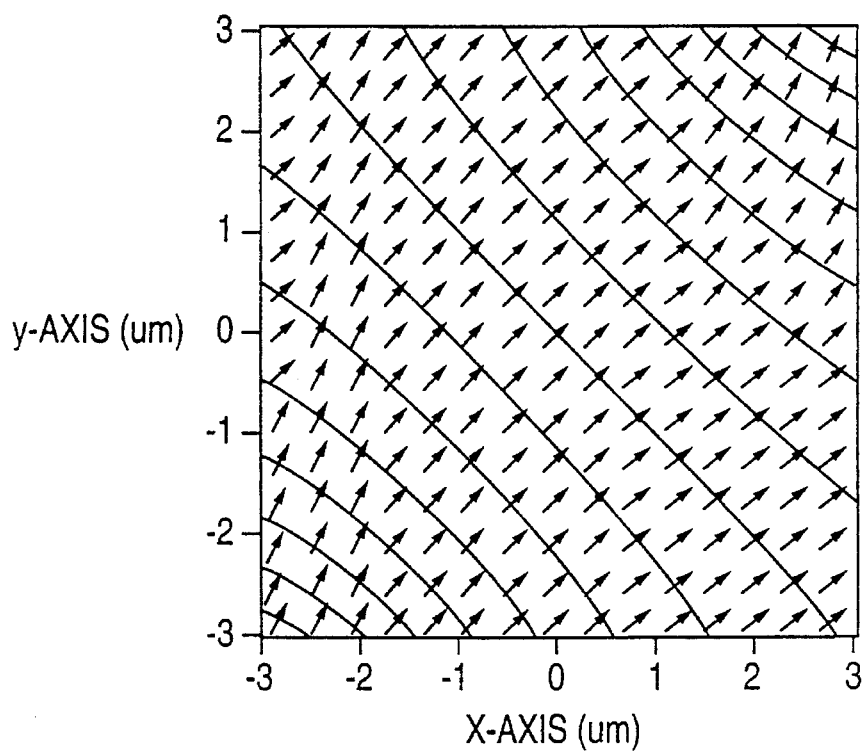
FIG. 2 is a view illustrating an example of the electrical field distribution by a poling electrode which is designed to make an optical director at the angle of 45°.

FIG. 2 shows a graph of the electrical field formed by the poling electrodes 4 and 3 which are designed to make the 45°'s electro-optic director. Herein, the thickness t of the waveguide is 10 µm, the width w of the electrode is 10 µm, the distance s from the center of the upper poling electrode to that of the lower poling electrode is 14 µm and the electrical field distribution in the waveguide is calculated within the range of the area of 6 µm×6 µm. In FIG. 2, the solid line is an equiponential line, and the arrow is an electrical field direction. The electrical field direction at the center of the wave guide is 45°, but away from the center, the electric field direction somewhat varies the angle of 45°. The arrangement angle of the average electrical field is about 46° within the range of 6 µm×6 µm from the center of the waveguide. The size of every waveguides is below 6 µm×6 µm, so it is noted that the electro-optic director of the core layer 1 is maintained at the angle of about 45° to the x-axis of FIG. 1 because of the proper design of the poling electrodes 4 and 3.

II. Mode Conversion Effect on Waveguide having Optical Birefringence

In order to see the operational characteristics of the substantial elements, the effective propagation constants $N_a$ and $N_b$ of the normal mode must be calculated, but it is difficult to obtain these constants analytically. The invention uses the computer simulation by the vector BPM for obtaining the effective propagation constants.

Figure 3:
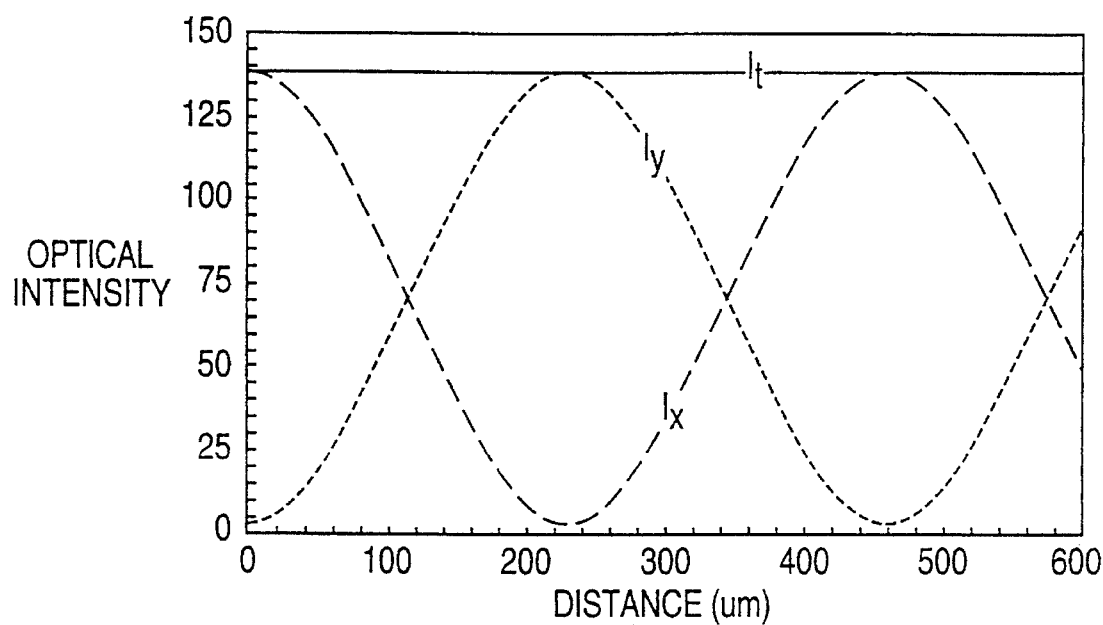
FIG. 3 is a graph illustrating the result which one example of the polarization conversion characteristics are investigated by a computer simulation using a vector BPM (bector beam propagation) according to the invention.

FIG. 3 illustrates a graph of the result when the polarization conversion characteristics of the waveguide structure provided with the waveguide layer poled at the angle of 45° are investigated by a computer simulation using a vector BPM according to the invention. The structure of the waveguide for use in the computer simulation is the same as that of FIG. 1. The size of the core layer 1 of the waveguide is 3 μm×3 μm, and the used wavelength is 1.3 μm. The poling electrical field distribution uses that of FIG. 2. The cladding layer 2 is made of linear materials and has an isotropic property. The refraction factor of the used cladding layer 2 is 1.612, the refraction factor of a medium along a-director from the center of the core layer 1 is 1.627 and the refraction factor of a medium along b-director is 1.622. In other words, the size of the refraction factor birefringence derived from the polymer thin film is fixed at 0.005.

As seen from FIG. 3, the intensity of the incident polarization light or the intensity $I_x$ of the TE mode $E_x$ (TE) decreases according to the movement of the incident light through the waveguide. It is found that the component $E_y$ (TM) which is absent at first, is generated. The intensity $I_x$ of the TE mode at the displacement of 220 μm is minimized. On the contrary the intensity $I_y$ of the TM mode $E_y$ (TM) is maximized. Again, the intensity $I_x$ of the TE mode $E_x$(TE) is maximized at the displacement of 440 μm. The change of the incident light intensity shows the same tendency as that of $E_x$ and $E_y$ expressed by the equation 1. The tendency is repeated according to the displacement through the waveguide. The cycle is referred to as a beat length $L_B$ as mentioned in the equation 4. In the example, the beat length is about 440 μm, and the size ($N_a$–$N_b$) of the electro-optic birefringence in the waveguide is about 0.0029 which is substantially smaller than the electro-optic birefringence of the non-linearity polymer (0.005).

III. TE-TM Mode Switching by Electro-Optic Effect

It is very difficult to obtain the change of the value δβ by the electro-optic effect like the calculation of the effective refraction factor in the normal mode, when the electrical field is applied to the waveguide. Therefore, the electro-optic effect has to be calculated using the vector BPM.

Figure 4:
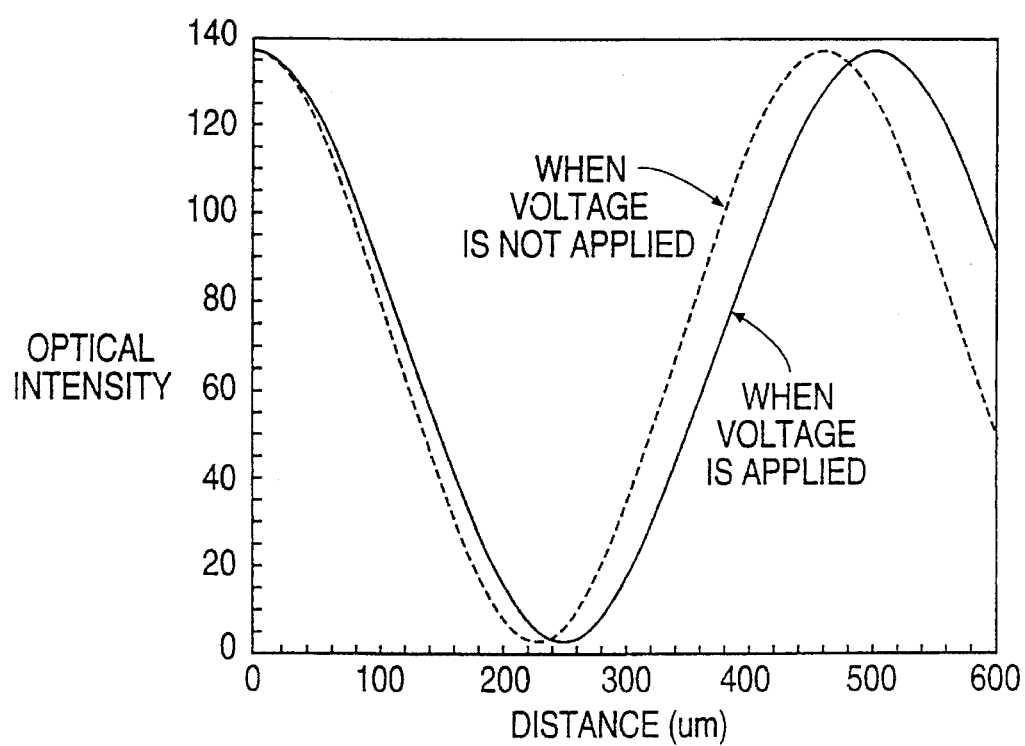
FIG. 4 is a graph illustrating the characteristic changes represented by the electro-optic effect when the electrical field is applied along the a- director to a waveguide to change the refraction factor by 0.0005.

FIG. 4 is a graph illustrating the characteristic changes according to the waveguide length of the incident light component $E_x$ when the voltage is applied to the element of FIG. 3 to change the refraction factor by 0.0005 along the a-director.

Referring to FIG. 4, the phase change of the component E# is 0.875 radians between cases when the electrical field is applied and not applied after the movement of the incident light. In other words, it is known that the difference of the effective propagation constant between the normal modes of the waveguides is modulated. In order to switch the TE-TM mode, the first outputting state must become the TE or TM state. Thus, the first state of the waveguide must be adjusted to meet the conditions of the equations 3 and 5.

A method for adjusting the first polarization state of the outputted light can be performed by adjusting the length of the waveguide poling electrode to satisfy the conditions of the equations 3 and 5 or by adjusting the size of the electro-optic birefringence through the intensity of the polling electrical field with respect to a given length of the poling electrode. It is difficult to fabricate the configuration for adjusting the waveguide poling length and controlling the polarization state of the outputting light through the adjustment of the size of the birefringence. The additional use of a bias electrode, except for the switching electrode, enables an element to be more realistic.

Figure 5:
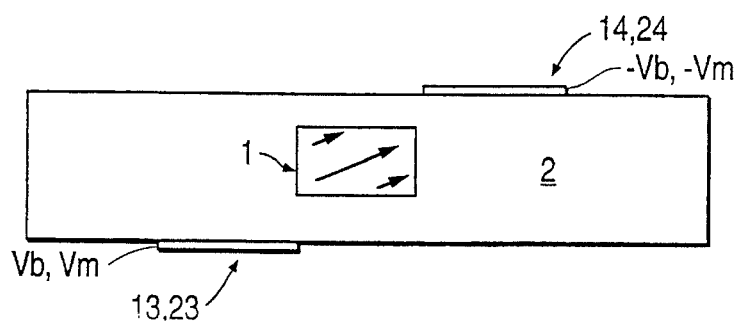
Figure 6:
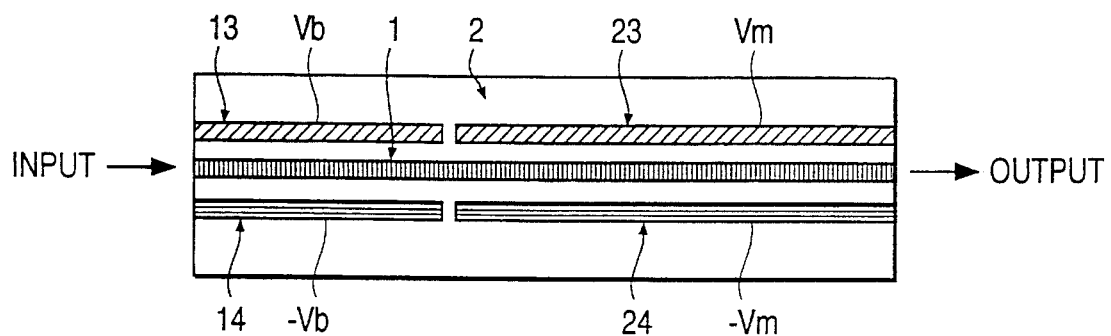

FIG. 5 shows the configuration of an element enabling the TE-TM mode conversion by using a bias electrode and a modulation electrode, wherein FIG. 5A is a cross-sectional view of the TE-TM mode converter and FIG. 5B is a plane view of the TE-TM mode converter.

As described above, the non-linear polymers of the core layer 1 are arranged at the angle of 45° by the poling electrodes 3 and 4, when these poling electrodes 4 and 3 are removed. Then, upper and lower bias electrodes 14 and 13 and upper and lower modulation electrodes 24 and 23 are formed as shown in FIG. 5. The bias electrodes 14 and 13 and the modulation electrodes 24 and 23 of course are electrically insulated from one another. The upper and lower bias electrodes 14 and 13 are for adjusting the first outputting polarization state of the waveguide, and the upper and lower modulation electrodes 24 and 23 are for controlling the TE-TM mode switching as represented in the equation 3. In other words, the bias voltage $V_b$ applied to the bias electrodes 14 and 13 is adjusted to force the first outputting polarization state of the element to be the TE or TM state. Then, the voltage $V_m$ applied to the modulation electrodes 24 and 23 is adjusted to change δβL/2 into π/2. Thus, the TE-TM mode switching is accomplished.

As described above, the invention provides a TE-TM mode converter of a waveguide type having a simple fabrication and a lower cost by using the poling characteristics and the electro-optic birefringence and the electro-optic effect derived by the poling, which can be replaced with a conventional mode converter. The invention also facilitates elements of another optical waveguide to be integrated therewith and may be utilized as an element for manufacturing a light intensity modulator and a polarization stabilizer.

What is claimed is:

1. A TE-ME mode converter on a polymer waveguide comprising:

a core layer formed as a medium of non-linear polymer materials, to which an electrical dipole of a linear polymer which is freely arranged is fixed toward a direction of an electrical field artificially inclined to a pair of poling electrodes;

a cladding layer formed around the periphery of the core layer and made of materials having a refraction factor lower than the core layer;

a pair of bias electrodes, respectively mounted on the upper and lower portions of the cladding layer, for controlling the first polarization state of a core layer outputting light; and a pair of modulation electrodes mounted on the upper and lower portions of the cladding layer which are electrically insulated from the pair of bias electrodes, for switching into the TM mode or the TE mode a first outputting state set at the TE mode or the TM mode by a bias voltage applied to the bias electrodes.

2. The TE-ME mode converter on a polymer waveguide as claimed in claim 1, wherein:

an optical director of the non-linear polymer in the core layer is poled at the average angle of 45° with respect to an x-axis.

3. The TE-ME mode converter on a polymer waveguide as claimed in claim 1, wherein:

the pair of the poling electrodes are spaced away in a vertical or horizontal direction from each other to maintain a direction of the poling electrical field at the angle of 45° to an x-axis by the poling electrodes, and a width w of the poling electrodes and the horizontal distance s between the poling electrodes are adjusted.

4. The TE-ME mode converter on a polymer waveguide as claimed in claim 3, wherein:

the width w of the poling electrodes is about 10 μm and the horizontal space s from a center of one of the poling electrodes to the center of the other poling electrode is 14 μm, when a vertical space between the poling electrodes or the thickness t of the waveguide is 10 μm.

* * * * *